US007020490B2

(12) United States Patent
Khatri

(10) Patent No.: US 7,020,490 B2
(45) Date of Patent: Mar. 28, 2006

(54) RADIO COMMUNICATION SYSTEM

(75) Inventor: Bhavin S. Khatri, London (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 623 days.

(21) Appl. No.: 10/055,370

(22) Filed: Jan. 23, 2002

(65) Prior Publication Data

US 2002/0127978 A1 Sep. 12, 2002

(30) Foreign Application Priority Data

Jan. 30, 2001 (GB) .................................... 0102316

(51) Int. Cl.
*H04B 1/38* (2006.01)

(52) U.S. Cl. ..................... 455/561; 455/562.1; 455/68; 370/340

(58) Field of Classification Search ............. 455/562.1, 455/277.1, 560, 561; 370/340, 341; 375/260
See application file for complete search history.

(56) References Cited

U.S. PATENT DOCUMENTS

| | | | | |
|---|---|---|---|---|
| 5,621,752 | A * | 4/1997 | Antonio et al. | 375/144 |
| 5,893,033 | A * | 4/1999 | Keskitalo et al. | 455/562.1 |
| 5,959,579 | A * | 9/1999 | Gladh | 455/562.1 |
| 5,966,094 | A * | 10/1999 | Ward et al. | 342/373 |
| 6,061,553 | A * | 5/2000 | Matsuoka et al. | 455/273 |
| 6,087,986 | A * | 7/2000 | Shoki et al. | 342/383 |
| 6,184,828 | B1 * | 2/2001 | Shoki | 342/372 |
| 6,188,913 | B1 * | 2/2001 | Fukagawa et al. | 455/562.1 |
| 6,336,033 | B1 * | 1/2002 | Yamaguchi et al. | 455/277.2 |
| 6,349,218 | B1 * | 2/2002 | Nakagawa et al. | 455/562.1 |
| 6,393,303 | B1 * | 5/2002 | Katz | 455/562.1 |
| 6,643,526 | B1 * | 11/2003 | Katz | 455/67.11 |
| 6,784,838 | B1 * | 8/2004 | Howell | 342/377 |
| 6,952,454 | B1 * | 10/2005 | Jalali et al. | 370/340 |
| 2003/0114194 | A1 * | 6/2003 | Hiramatsu | 455/562 |
| 2003/0123425 | A1 * | 7/2003 | Walton et al. | 370/341 |
| 2004/0209572 | A1 * | 10/2004 | Thomas | 455/562.1 |
| 2005/0250544 | A1 * | 11/2005 | Grant et al. | 455/562.1 |

FOREIGN PATENT DOCUMENTS

| | | |
|---|---|---|
| WO | WO 9836596 | 8/1998 |
| WO | WO 9842150 | 9/1998 |
| WO | WO 0156192 | 8/2001 |

* cited by examiner

*Primary Examiner*—Lana Le
(74) *Attorney, Agent, or Firm*—Larry Liberchuk

(57) ABSTRACT

A radio communication system has a communication channel with many paths between two terminals having many antennas. One of the terminals has a receiver and a transmitter, where the receiver is configured to determine the directions from which the strongest signals arrive from the other terminal, corresponding to particular paths. The transmitter separates a signal for transmission into sub-streams and transmits each sub-stream in the respective directions determined by the receiver.

15 Claims, 4 Drawing Sheets

RADIO COMMUNICATION SYSTEM

The present invention relates to a radio communication system having a communication channel comprising a plurality of paths between first and second terminals, each comprising a plurality of antennas. The present invention also relates to a terminal for use in such a system and to a method of operating such a system.

In a radio communication system, radio signals typically travel from a transmitter to a receiver via a plurality of paths, each involving reflections from one or more scatterers. Received signals from the paths may interfere constructively or destructively at the receiver (resulting in position-dependent fading). Further, differing lengths of the paths, and hence the time taken for a signal to travel from the transmitter to the receiver, may cause inter-symbol interference.

It is well known that the above problems caused by multipath propagation can be mitigated by the use of multiple antennas at the receiver (receive diversity), which enables some or all of the multiple paths to be resolved. For effective diversity it is necessary that signals received by individual antennas have a low cross-correlation. Typically this is ensured by separating the antennas by a substantial fraction of a wavelength, although closely-spaced antennas may also be employed by using techniques disclosed in our co-pending unpublished International patent application PCT/EPO1/02750 (applicant'reference PHGB000033). By ensuring use of substantially uncorrelated signals, the probability that destructive interference will occur at more than one of the antennas at any given time is minimised.

Similar improvements may also be achieved by the use of multiple antennas at the transmitter (transmit diversity). Diversity techniques may be generalised to the use of multiple antennas at both transmitter and receiver, known as a Multi-Input Multi-Output (MIMO) system, which can further increase system gain over a one-sided diversity arrangement. As a further development, the presence of multiple antennas enables spatial multiplexing, whereby a data stream for transmission is split into a plurality of sub-streams, each of which is sent via many different paths. One example of such a system is described in U.S. Pat. No. 6,067,290, another example, known as the BLAST system, is described in the paper "V-BLAST: an architecture for realising very high data rates over the rich-scattering wireless channel" by P W Wolniansky et al in the published papers of the 1998 URSI International Symposium on Signals, Systems and Electronics, Pisa, Italy, Sep. 29, to Oct. 2, 1998.

Typically in a MIMO system the original data stream is split into J sub-streams, each of which is transmitted by a different antenna of an array having $n_T$=J elements. A similar array having $n_R \geqq J$ elements is used to receive signals, each antenna of the array receiving a different superposition of the J sub-streams. Using these differences, together with knowledge of the channel transfer matrix H, the sub-streams can be separated and recombined to yield the original data stream. In a variation of such a system, disclosed in published European Patent Application EP-A2-0,905,920, the sub-streams are transformed before transmission such that, after propagation through the channel, another transformation recovers the original sub-streams. However, such a system requires knowledge of the transfer matrix H at both transmitter and receiver, since the transformations applied are based on a singular value decomposition of that matrix.

The performance gains which may be achieved from a MIMO system may be used to increase the total data rate at a given error rate, or to reduce the error rate for a given data rate, or some combination of the two. A MIMO system can also be controlled to reduce the total transmitted energy or power for a given data rate and error rate.

In theory, the capacity of the communications channel increases linearly with the smaller of the number of antennas on the transmitter or the receiver. However, simulation results in the paper "Channel Capacity Evaluation of Multi-Element Antenna Systems using a Spatial Channel Model" by A G Burr in the published papers of the ESA Millennium Conference on Antennas and Propagation, Davos, Switzerland, Apr. 9–14, 2000 show that, in practice, the capacity of the communications channel is limited by the number of scatterers placed in the environment.

A more useful way to view a MIMO system is that the capacity of the channel is limited by the number of statistically independent paths between the transmitter and receiver, caused by scatterers in the environment. Therefore, there is no advantage in the antenna arrays at the transmitter or receiver having more elements than the number of independent paths caused by their particular location in a given environment. Presently-proposed MIMO systems employ a fixed number of antennas at the transmitter and receiver and thus a fixed number of sub-streams, which becomes inefficient if the number of independent paths is less than the number of sub-streams. In addition, as discussed above, known MIMO systems rely on placing the antennas sufficiently far apart to achieve substantially uncorrelated signals.

An object of the present invention is to provide a MIMO system having improved efficiency and flexibility.

According to a first aspect of the present invention there is provided a radio communication system having a communication channel comprising a plurality of paths between first and second terminals each having a plurality of antennas, wherein the first terminal comprises receiving means having direction determining means for determining a plurality of directions from which signals arrive from the second terminal, means for receiving a plurality of respective signals from some or all of the plurality of directions, means for extracting a plurality of sub-streams from the received signals and means for combining the plurality of sub-streams to provide an output data stream, and the first terminal further comprises transmitting means having means for separating a signal for transmission into a plurality of sub-streams, and transmitting means for transmitting each sub-stream into a respective one of the plurality of directions determined by the receiving means.

The present invention improves flexibility by allowing a varying number of transmitted sub-streams, and improves efficiency and throughput by taking account of the angular distribution of multipath signals, without requiring any increase in total transmitted power compared to a conventional system in which terminals each have a single antenna.

The directions of arrival of signals may be determined by measuring an angular power spectrum and determining the directions from which the strongest signals arrive. For transmission, each sub-stream may be transmitted with the same power and bitrate, or the individual powers and/or bitrates of the sub-streams could be varied depending on some quality parameter such as signal to noise ratio. This could result in further improvements to system capacity for a given total radiated power from a terminal. There is no need for the number of directions from which signals are received to be the same as the number of directions in which signals are transmitted.

The plurality of antennas at each terminal may be of any suitable type, with directional or omnidirectional radiation patterns depending on the application. There is no need for all the antennas on a terminal to be of the same type or to have the same radiation pattern, nor is there any need for the terminals to have the same number of antennas.

According to a second aspect of the present invention there is provided a terminal for use in a radio communication system having a communication channel comprising a plurality of paths between the terminal and another terminal, wherein receiving means are provided having direction determining means for determining a plurality of directions from which signals arrive from the other terminal, and transmitting means are provided having means for separating a signal for transmission into a plurality of sub-streams, and transmitting means for transmitting each sub-stream into a respective one of the plurality of directions determined by the receiving means.

A terminal may operate in accordance with the present invention both as a transmitter and a receiver. Alternatively, a terminal may operate in accordance with the present invention as a transmitter while employing a conventional receiver. Such a terminal still requires receiving means capable of determining directions of received signals, so that it is able to determine into which directions to transmit signals.

According to a third aspect of the present invention there is provided a terminal for use in a radio communication system having a communication channel comprising a plurality of paths between the terminal and another terminal, wherein receiving means are provided having direction determining means for determining a plurality of directions from which signals arrive from the other terminal, means for receiving a plurality of respective signals from some or all of the plurality of directions, means for extracting a plurality of sub-streams from the received signals and means for combining the plurality of sub-streams to provide an output data stream.

The present invention may also be operated as a receiver alone.

According to a fourth aspect of the present invention there is provided a method of operating a radio communication system having a communication channel comprising a plurality of paths between first and second terminals each having a plurality of antennas, the method comprising the first terminal determining a plurality of directions from which signals arrive from the second terminal, receiving signals from some or all of the plurality of directions, extracting a plurality of sub-streams from the received signals and combining the plurality of sub-streams to provide an output data stream, the method further comprising the first terminal separating a signal for transmission into a plurality of sub-streams, and transmitting each sub-stream into a respective one of the plurality of determined directions.

The present invention is based upon the recognition, not present in the prior art, that by determining directions from which the strongest signals are received from a particular terminal and by transmitting signals to that terminal in these directions increased spectral efficiency is achieved since less power is wasted in transmission.

Embodiments of the present invention will now be described, by way of example, with reference to the accompanying drawings, wherein.

In the drawings the same reference numerals have been used to indicate corresponding features.

Figure 1:
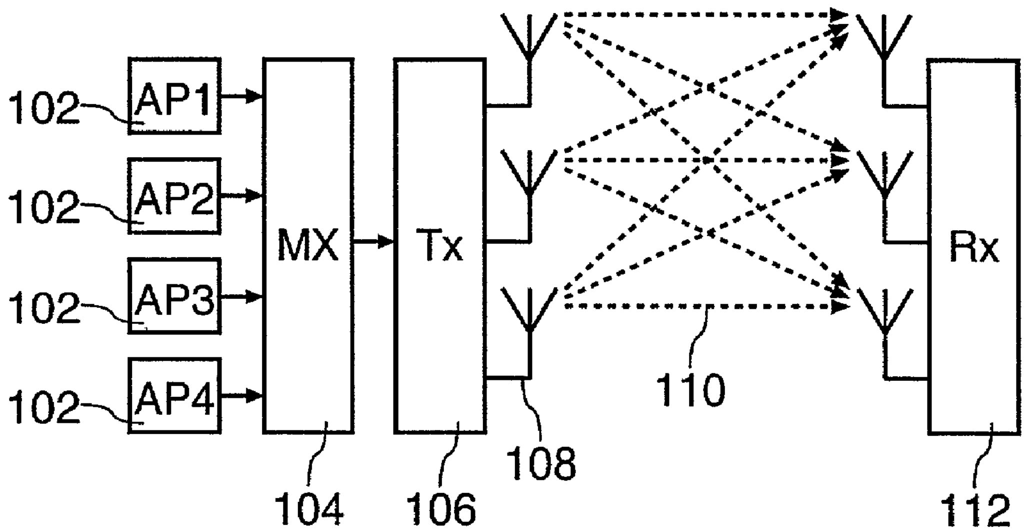
FIG. 1 is a block schematic diagram of a known MIMO radio system.

FIG. 1 illustrates a known MIMO radio system. A plurality of applications 102 (AP1 to AP4) generate data streams for transmission. An application 102 could also generate a plurality of data streams. The data streams are combined by a multiplexer (MX) 104 into a single data stream, which is supplied to a transmitter (Tx) 106. The transmitter 106 separates the data stream into sub-streams and maps each sub-stream to one or more of a plurality of transmit antennas 108.

Suitable coding, typically including Forward Error Correction (FEC), may be applied by the transmitter 106 before multiplexing. This is known as vertical coding, and has the advantage that coding is applied across all sub-streams. However, problems may arise in extracting the sub-streams since joint decoding is needed and it is difficult to extract each sub-stream individually. As an alternative each sub-stream may be coded separately, a technique known as horizontal coding which may simplify receiver operation. These techniques are discussed for example in the paper "Effects of Iterative Detection and Decoding on the Performance of BLAST" by X Li et al in the Proceedings of the IEEE Globecom 2000 Conference, San Francisco, Nov. 27 to Dec. 1, 2000.

If vertical coding is used the Forward Error Correction (FEC) which is applied must have sufficient error-correcting ability to cope with the entire MIMO channel, which comprises a plurality of paths 110. For simplicity of illustration only direct paths 110 between antennas 108 are illustrated, but it will be appreciated that the set of paths will typically include indirect paths where signals are reflected by one or more scatterers.

A receiver (Rx) 112, also provided with a plurality of antennas 108, receives signals from the multiple paths which it then combines, decodes and demultiplexes to provide respective data streams to each application. Although both the transmitter 110 and receiver 112 are shown as having the same number of antennas, this is not necessary in practice and the numbers of antennas can be optimised depending on space and capacity constraints. Similarly, the transmitter 106 may support any number of applications (for example, a single application on a voice-only mobile telephone or a large number of applications on a PDA).

The central principle behind any 'parallel' type communication system is to find multiple ways with which to communicate, that can in some way be distinguished at the receiver. For example in OFDM systems, in effect, different sub-streams are sent at different carrier frequencies, the spacing of which are such that they are orthogonal and can be distinguished at the receiver. Similarly in the BLAST system, in a well scattered environment, by having the transmit antennas spaced a minimum distance of $\lambda/2$ from each other, the signal received by a single antenna consists of a linear sum of each sub-stream, the phase and amplitude of each sub-stream being independent. However, the sub-streams cannot be distinguished from the single antenna without more information—the problem is like solving a simultaneous equation with J unknowns (the sub-streams), for which at least J unrelated or independent equations are needed to distinguish the J unknowns unambiguously. In the BLAST system, this is achieved by having $n_R$ ($\geqq$J) antennas, each spaced apart from the others by a minimum distance of λ/2. This minimum spacing ensures that the $n_R$ signals from each receiver antenna provide $n_R$ independent linear combinations of the J unknown sub-streams—the $n_R$ combinations being the required simultaneous equations. The coefficients for the equations are the complex channel transfer coefficients between the $n_T$ transmitter antennas and the $n_R$ receiver antennas, described by a transfer matrix H (discussed below).

An alternative way to transmit or receive uncorrelated waveforms is to use angular separation, a technique that is exploited in many current diversity systems (i.e. angular diversity). Multipath signals that arrive from (or are sent into) different directions generally experience different scatterers and thus each experience a different attenuation and time delay (i.e. a different complex channel transfer coefficient). So analogous to the BLAST system, uncorrelated signals can be formed at the receiver by transmitting sub-streams into distinct angles or directions.

A system made in accordance with the present invention provides an alternative wireless transceiver architecture to known systems such as BLAST, the basis of the invention being the transmission of K separate sub-streams into K different directions and the reception of multipath signals from J distinct directions. The chosen directions, in each case, will depend on the directions from which multipath signals with greatest power or Signal to Noise Ratio (SNR) were received, as determined from a measurement of angular power spectrum A(Ω). Experimental measurements and simulations, for example as reported in the paper "A statistical model for angle of arrival in indoor multipath propagation" by Q Spencer et al in the published papers of the 1997 IEEE Vehicular Technology Conference, Phoenix, USA, May 4–7 1997, pages 1415–19, suggest that multipath signals arrive in groups or clusters about uniformly random azimuth angles. Thus, it is likely that the chosen directions will correspond to the angle of arrival of these clusters. However, this does not prevent the invention from making use of individual paths within a cluster, provided an array of high enough resolution is used. Although the present invention describes a transceiver architecture, either the transmitter part or the receiver part may be used independently with another receiver or transmitter design such as BLAST. This is because at the transmitter or receiver the departing or incoming signals can be treated as either plane waves travelling in different directions (angular domain) or as an interference pattern in space (spatial domain as in BLAST).

A major advantage of an architecture according to the present invention is that by measuring the angular power spectrum of incoming multipath signals it is possible to determine the directions at which significant scatterers lie. Thus by beamforming at the receiver 112 into the directions in which multipath signals arrive, receiver power is used more efficiently. Subsequently, by transmitting into those directions, full use is made of the possible scatterers in the environment, thereby achieving an increased spectral efficiency since more of the transmitted power is received by the receiver 112. This is increasingly important for wireless systems operating at higher frequencies, where greater attenuation on average reduces the number of useful multipath components at the receiver.

Another advantage is that, as a transmitter, no knowledge of the transfer matrix H is needed, unlike the system disclosed in EP-A2-0,905,920, only of the angular power spectrum A(Ω).

Figure 2:
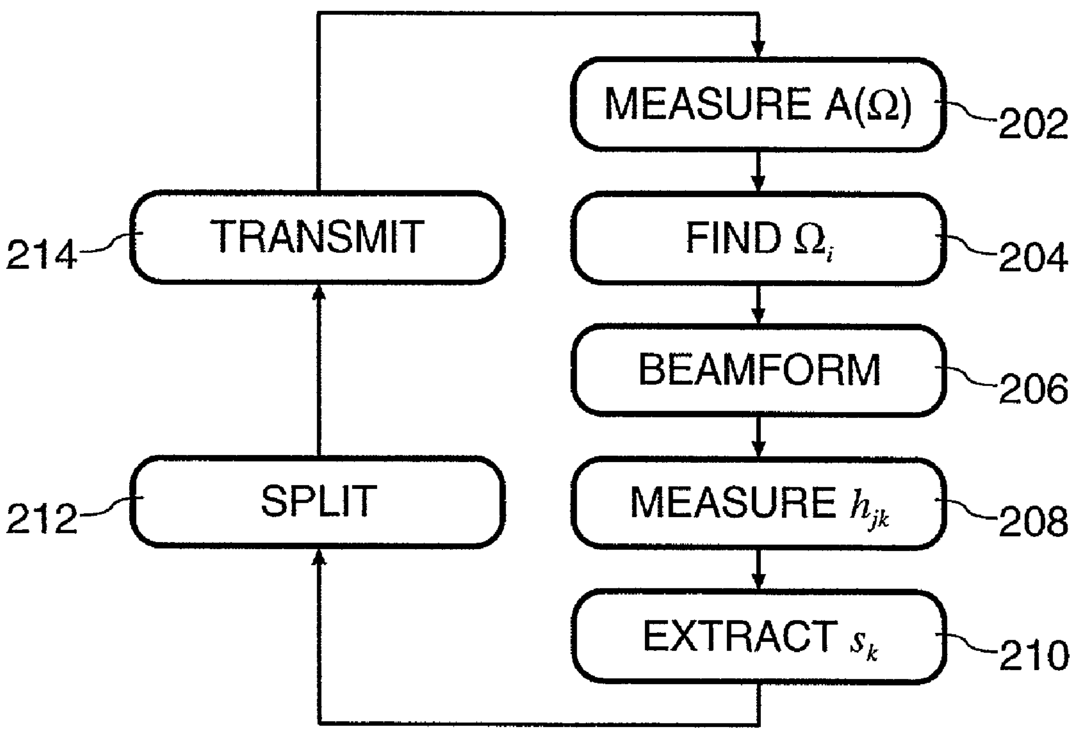
FIG. 2 is a flow chart illustrating the operation of a transceiver made in accordance with the present invention.

FIG. 2 is a flow chart illustrating the operation of a transceiver for a time-division multiplex system made in accordance with the present invention. The transceiver operation is depicted as a cycle for a transmitter 106 and receiver 112 forming part of a single transceiver, with steps on the right of the figure relating to the receiver 112 and those on the left to the transmitter 106.

The first action of the receiver 112 is to measure, at step 202, A(Ω), the angular spectrum of incoming multipath signals. Next, at step 204, the angular spectrum is processed to find $\Omega_j$, which are the directions the first J peaks of greatest power in A(Ω). Beamforming techniques are then used, at step 206, in the chosen directions $\Omega_j$ to obtain J respective received signals $r_j$. At step 208 elements of the transfer matrix H are determined, where $h_{jk}$ is the complex transfer coefficient of the channel between the $k^{th}$ transmit direction and the $j^{th}$ receive direction. Finally, for the receiver 112, at step 210 standard multiuser detection techniques are used to extract the K transmitted sub-streams, where $s_k$ is the $k^{th}$ sub-stream.

In the transmitter 106 the first action, at step 212, is to demultiplex the incoming data into J lower rate data streams, after which, at step 214, each of the J sub-streams generated is transmitted in its respective direction $\Omega_j$. The transceiver then returns to receiver mode at step 202, adapting to any changes in multipath that may have occurred.

The precise implementation of each step in FIG. 2 is not of particular importance in relation to the present invention, since there are a range of suitable known techniques. Examples of these are described below. In practice, each cycle of the flow chart occurs for a complete burst of data. Hence, it is assumed that the measured angular spectrum A(Ω) and transfer matrix H are valid for the whole burst, and that at least A(Ω) is valid for the next burst to be transmitted.

An embodiment of the present invention as separate transmitter and receiver parts will now be described, considering first the transmitter part since it is generally more straightforward than the receiver. The description covers one reception and transmission cycle, i.e. the reception (including the processing/decoding) and then transmission of one frame or burst of bits.

The frame of bits is assumed to include 'payload' data along with any extra overhead for protocols and training sequences. For the adaptation process to be effective, the duration of the frame should be short enough for changes in the channel, caused by movement of transmitter, receiver or scatterers, to be negligible over the duration of the frame. Another important assumption is that the channel is narrowband, i.e. the delay spread of the channel is a lot smaller than the bit or symbol duration, so that the Channel Impulse Response (CIR) is essentially an impulse or delta function. This is the reason for denoting $h_{jk}$ the channel coefficient rather than the CIR. However, the present invention could be applied to wideband channels, for example if equalisation is used on each sample received from the specified directions $\Omega_j$.

Figure 3:
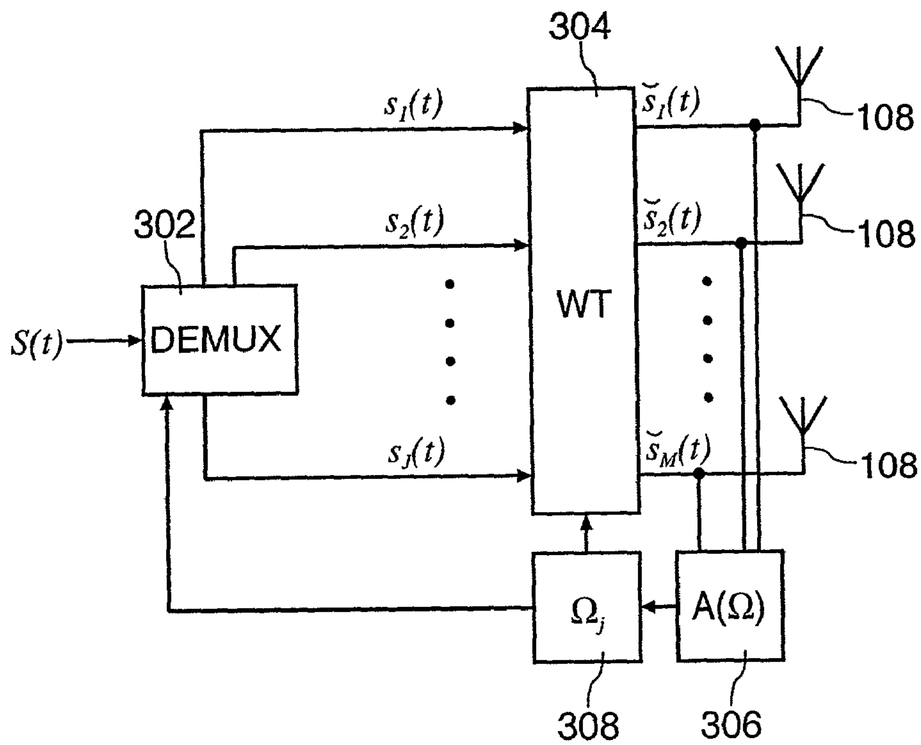
FIG. 3 is a block schematic diagram of a transmitter.

FIG. 3 is a block schematic diagram of a transmitter 106. Incoming data S(t) is separated by a demultiplexer 302 into J sub-streams $s_j(t)$ $(1 \leqq j \leqq J)$, where $J \leqq M$ and M is the number of antennas 108. The number of sub-streams may be varied depending on radio channel characteristics or other requirements. Optionally, the bitrate $B_j$ or transmitted SNR $\gamma_{transJ}$ may be varied for each sub-stream so as to maximise the overall transmitted bitrate for a given outage probability. This technique is known as "water filling", and is described for example in *Information Theory and Reliable Communication by* Robert Gallager, Wiley, pages 343 to 354.

Figure 4:
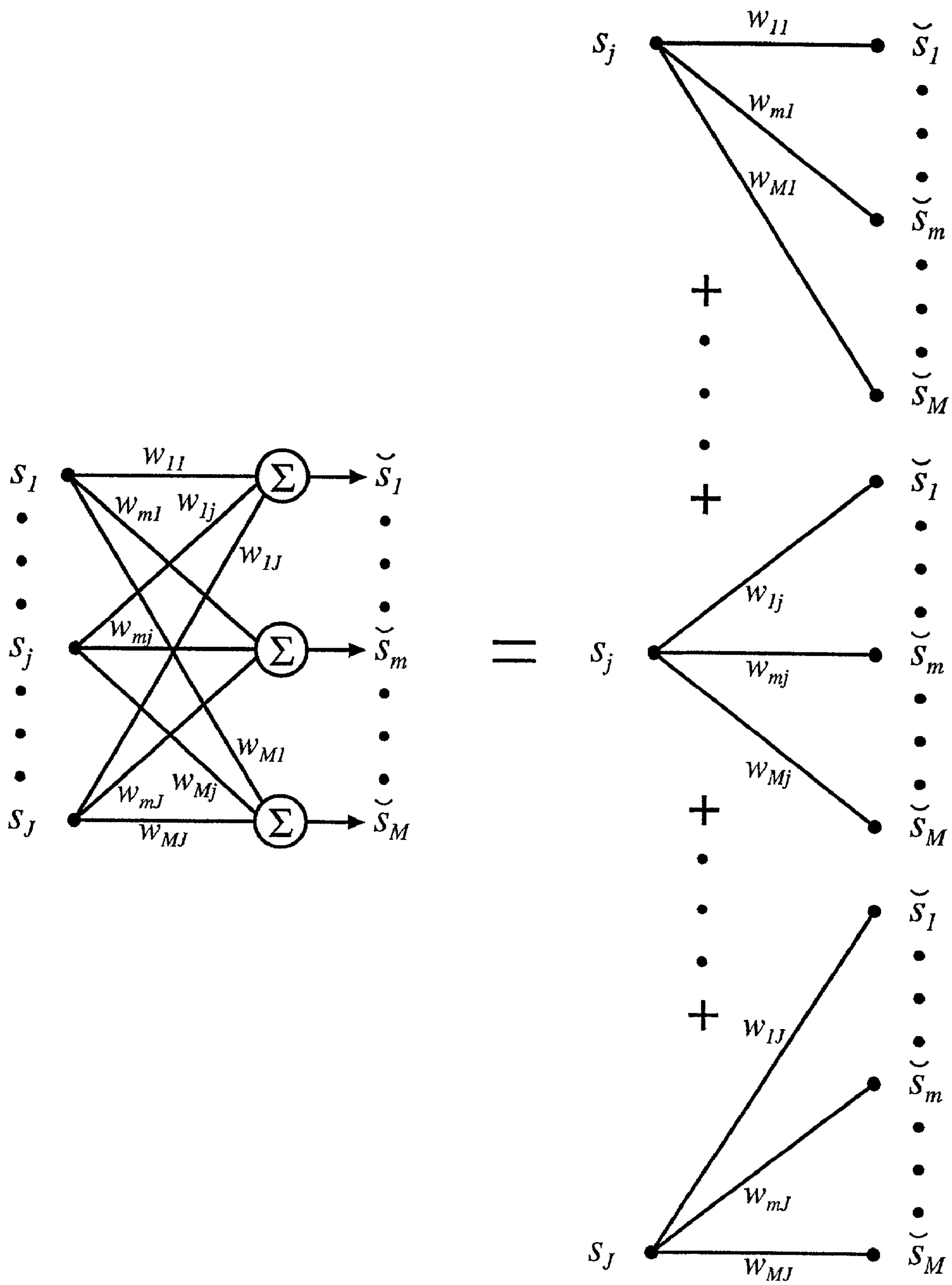
FIG. 4 is a diagram illustrating the operation of a weighting matrix.

The J sub-streams are fed into a multiple-beam weighting matrix 304. This applies a set of complex weights $w_{mj}$ to the J input sub-streams $s_j$ to generate M output sub-streams $\check{S}_m$ according to the following equation $$\begin{bmatrix} \check{s}_1 \\ \check{s}_2 \\ \vdots \\ \vdots \\ \check{s}_M \end{bmatrix} = \begin{bmatrix} w_{11} & w_{12} & \cdots & w_{1J} \\ w_{21} & & & w_{2J} \\ \vdots & & & \vdots \\ w_{MJ} & \cdots & \cdots & w_{MJ} \end{bmatrix} \cdot \begin{bmatrix} s_1 \\ s_2 \\ \vdots \\ s_J \end{bmatrix} \quad (1)$$

which can also be written as š=Ws. The result of applying the complex weight matrix W to the vector of signals s is the vector of signals š, the $m^{th}$ element of which is the signal applied to the $m^{th}$ antenna 108 of the array. Essentially, the weighting matrix 304 is beamforming for each of the J sub-streams. Each sub-stream has its own set of weights across the antenna array, so that even though the effects for weights for all the sub-streams add up at the antenna array, the principle of superposition means the resultant far-field radiation pattern will be sum of radiation patterns designed for each sub-stream. All the fields will cancel or add up in the designed manner to give the J sub-streams propagating in their respective directions. The generation of the antenna signals is shown graphically in FIG. 4.

The angular spectrum of incoming multipath signals, A(Ω), is measured during receiver operation by a measuring block 306, as described below. A direction finding block 308 processes this spectrum to determine the J directions with the best SNR and determines the required weights $w_{mj}$.

As indicated above, the direction in which the $j^{th}$ sub-stream is transmitted is controlled by the set of weights $w_{mj}$, where $1 \leqq m \leqq M$ (i.e. the $j^{th}$ column of the weight matrix W, denoted as $w_j$). This is shown mathematically by viewing equation 1 in the following way:

$$\check{s} = \begin{bmatrix} \check{s}_1 \\ \check{s}_2 \\ \vdots \\ \vdots \\ \check{s}_M \end{bmatrix} = \sum_{j=1}^{J} s_J \begin{bmatrix} w_{1J} \\ w_{2J} \\ \vdots \\ \vdots \\ w_{MJ} \end{bmatrix} = \sum_{j=1}^{J} s_j w_j \quad (2)$$

The M×1 vector š is a sum of J vector terms, the $j^{th}$ term in the summation being the $j^{th}$ column vector of the weight matrix ($w_j$) multiplied by the $j^{th}$ sub-stream $s_j$. Hence, all that is left to do is to choose the complex weights for each of the J sub-streams, which will become the columns of the weight matrix W.

In choosing the weights for the $j^{th}$ sub-stream, it is desirable to minimise the power sent into other directions corresponding to q≠j, in order to minimise the Signal to Interference plus Noise Ratio (SINR) for the $j^{th}$ sub-stream at the receiver. One possible approach is to determine a set of weights to generate a beam peak in the direction $\Omega_j$ and a null in each of the other directions $\Omega_q$ ($q \neq j$, $1 \leqq \{j,q\} \leqq J$). This is a standard array processing problem, but has to be applied J times in total, accounting for each sub-stream. An alternative approach is to treat all directions other than the desired direction as noise, and to minimise the noise output of the array subject to the condition that there is a beam peak in the direction Ωj. Various known methods are able to achieve either of the above objectives, for example as described in the paper "Application of Antenna Arrays to Mobile Communications, Part II: Beam-forming and Direction-of-Arrival Considerations", Proceedings of the IEEE, volume 85 number 8 (August 1997), pages 1195 to 1245.

Figure 5:
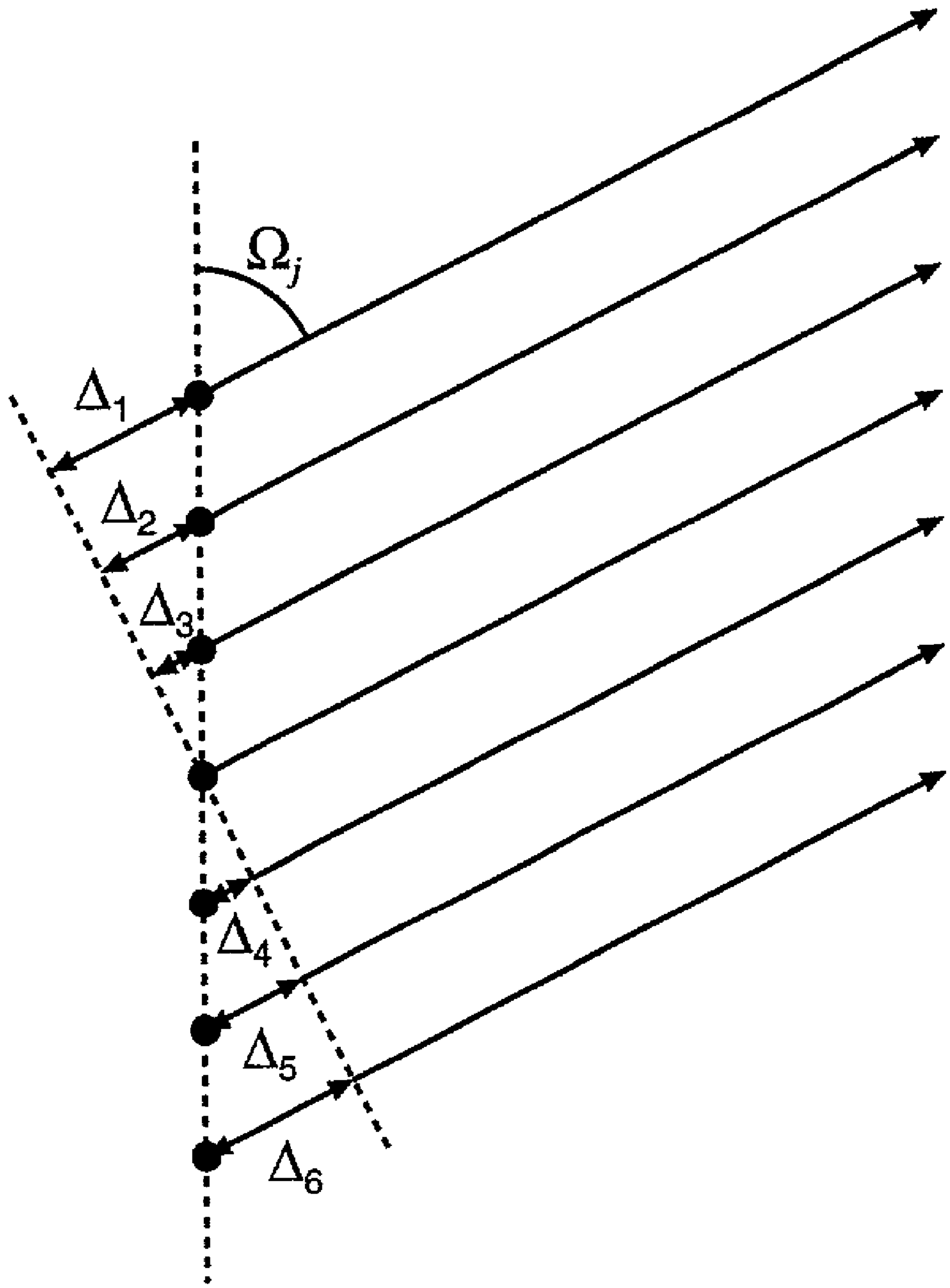
FIG. 5 is a diagram illustrating the generation of a plane wave from an antenna array.

For simplicity, the first approach will be used to illustrate an embodiment of the present invention. The basic principle relies on solving the following equation for each sub-stream:

$$w^T_j A = e_j \quad (3)$$

where A is an M×J matrix whose columns are the steering vectors $a(\Omega_j)$ for the directions $\Omega_J$ into which the J sub-streams are to be transmitted (i.e. $A=[a(\Omega_1), a(\Omega_2), \ldots, a(\Omega_J)]$) and $e_j$ is a row vector (1×J) whose elements are all zero except for the $j^{th}$, which is equal to one (i.e. the $p^{th}$ element of $e_j$ is $(e_j)_p=\delta_{pj}$, so for example $e_2=[01000]$ for J=5). The elements of the steering vector are just the responses needed in the array elements to produce a beam pattern with its peak in the direction $\Omega_j$. Therefore, the $j^{th}$ steering vector (or the $j^{th}$ column of A) is given by $$a(\Omega_j) = \begin{bmatrix} \exp\{j\omega_0\tau_1(\Omega_j)\} \\ \vdots \\ \exp\{j\omega_0\tau_m(\Omega_l)\} \\ \vdots \\ \exp\{j\omega_0\tau_M(\Omega_j)\} \end{bmatrix} \quad (4)$$

where $\tau_i(\Omega_j)$ is the time delay of the signal applied between the $m^{th}$ element ($1 \leqq m \leqq M$) of the array and an arbitrary origin. This is illustrated in FIG. 5, where the distances $\Delta_i$ are related to the time delays by $\Delta_i(\Omega_j)=\tau_i(\Omega_j)c$ and c is the speed of light.

Inverting equation 3 the correct weights to produce a peak in direction $\Omega_j$ and nulls in the other J−1 directions is $$w^T_J = e_J A^{-1} \quad (5)$$

This assumes that J=M, so that A is square. If J≠M, then the Generalised Inverse or Moore-Penrose Pseudoinverse $A^+$for non-square matrices can be used to solve equation 3.

Stated simply, the set of weights needed for the $j^{th}$ sub-stream is just the $j^{th}$ row of the inverse matrix of A. Hence, once the directions $\Omega_j$ have been determined, the steering matrix A can be constructed and the inverse $A^{-1}$ (or $A^+$) calculated. This is all the information required: the correct weights for each sub-stream are just the appropriate rows of the inverse matrix.

One further step is the transmission of training sequences in the frame of bits, which are needed by the receiver in order to extract the sub-streams. There are two types of training sequences needed by the receiver; one to enable a measurement of the angular spectrum A(Ω) and one for determination of the transfer matrix H. These points will be further discussed below.

Figure 6:
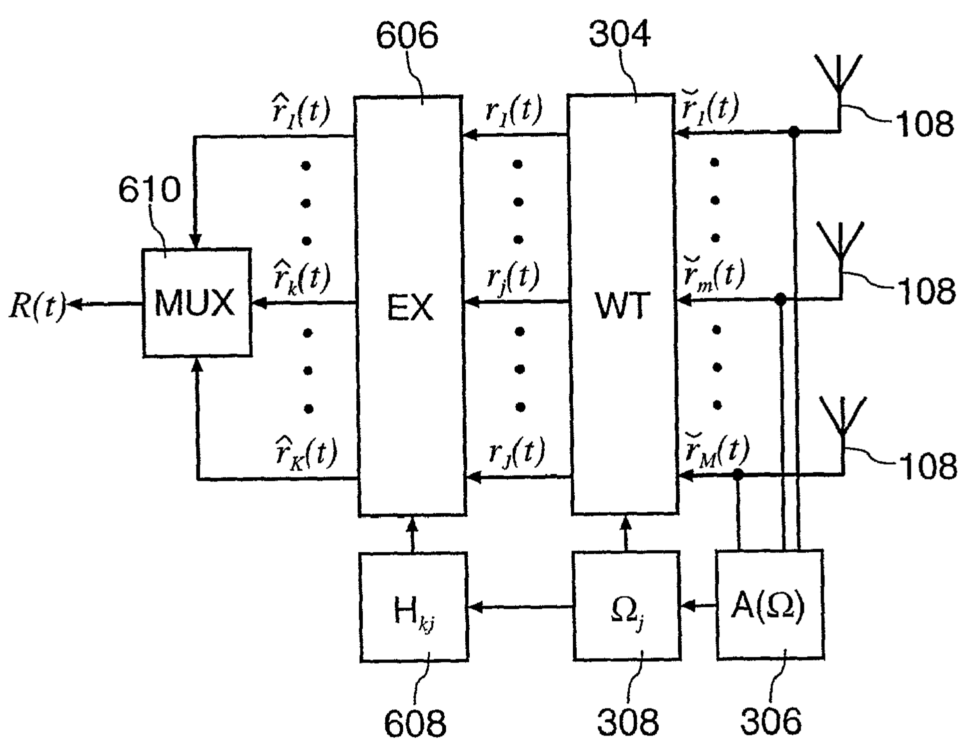
FIG. 6 is a block schematic diagram of a receiver.

Now consider the receiver part of a transceiver, with reference to FIG. 6. In discussing an embodiment of a receiver 112, it is assumed that the transmitter at the other end of the link has transmitted K sub-streams using either the described technique of sending sub-streams into different directions or a BLAST-like technique of sending sub-streams to separate antennas. The steps to be described would in practice occur before the steps described above for the transmitter.

The first step required in the receiver 112 is to make a measurement of the angular power spectrum A(Ω) in a measuring block 306. This measurement determines how the total power arriving is distributed across the different angles of arrival Ω. To be able to make this measurement correctly, it is necessary for the transmitter 106 at the other end of the link 110 to send a suitable training signal for a period of the data frame. A suitable training signal would be one that illuminated all possible scatterers in the environment (i.e. a signal sent omnidirectionally or isotropically from the transmitter 106). This could, for example, be achieved by transmitting from a single antenna element 106 for a duration of one frame (assuming that the element is omnidirectional). As will be discussed below the training signal should also allow the measurement of the transfer matrix H.

There are a variety of known ways in which the angular spectrum could be measured. The most conventional method is a simple Fourier transform of the signal that is received across the array of antennas. Other techniques involve using super-resolution algorithms on the received array signal. Such algorithms are described for example in the paper "ESPRIT—Estimation of Signal Parameters via Rotational Invariance Techniques" by R Roy and T Kailath, IEEE Transactions on Acoustics, Speech and Signal Processing, volume ASSP-37 (1989), pages 984 to 995. They allow a much higher angular resolution of the incoming multipath signals, although they are computationally more intensive than a Fourier transform. The exact nature of the algorithms will depend on the arrangement and geometry of the array used.

Once the angular power spectrum has been determined, the next step is to choose in a direction finding block 308 the J different directions from which the sub-streams will be received (and ultimately the directions into which the subsequent sub-streams for transmission will be transmitted by the transmitter 106). It is necessary for there to be at least as many directions J as the number of transmitted sub-streams K, so that the receiver can unambiguously extract all the sub-streams. One method is to simply search the angular spectrum for the J peaks of greatest SNR. This should result in a set of J directions $\{\Omega_1, \Omega_2, \ldots, \Omega_J\}$ from which multipath signals will be received.

The number of antenna elements 108 of the array, M sets the maximum value of J. This is because, as is well-known, an array of M antenna elements can only have a maximum of M−1 degrees of freedom in specifying the nulls of its antenna pattern. Hence, for each sub-stream there are at most M−1 independent directions in which nulls can be specified (and therefore from which other independent sub-streams can be received), so the maximum number of sub-streams is M. It is therefore important for transceivers at both ends of the wireless link 110 to have knowledge of the number of antennas 108 in the other transceiver'array.

The received signals across the array of antenna elements 108 can be viewed as a vector $\check{r}=[\check{r}_1 \ldots \check{r}_m \ldots \check{r}_M]^T$, where the $m^{th}$ element is the signal received by the $m^{th}$ antenna. A multiple-beam weighting matrix 304 applies a set of weights to the vector $\check{r}$ to give another vector of signals $r=[r_1 \ldots r_j \ldots r_J]^T$, which are the signals received from the directions $\Omega_j$ that were determined earlier. In other words, $$r=\check{W}\check{r} \tag{6}$$

It is therefore necessary to choose the rows of the weight matrix $\check{W}$, such that $r_j$ is the signal received from the direction $\Omega_j$. This problem has in fact already been solved in determining how to choose the weights that will transmit the $j^{th}$ sub-stream into the direction $\Omega_j$, for the transmitter part. Due to the reciprocity of receive and transmit arrays, the weights for receiving and transmitting in a given direction will be the same. Therefore, $$\check{W}=W^T \tag{7}$$

where $^T$ denotes the transpose of the matrix and is needed so that mathematically the signal vectors and weight matrix $\check{W}$correctly multiply. However, in the actual receiver no change in the weights are needed between the transmitter mode and receiver mode, since the reversal in the directions of the signals in the two cases takes care of the transpose.

The next step in the receiver 112 is to process, in an extraction block 606, the set of J signals, received from the J chosen receive directions, to generate K signals (denoted by $\hat{r}_k$, $1 \leqq k \leqq K$), which are estimates of the K sub-streams that were sent from the other end of the wireless link. The J signals are used to generate J simultaneous equations in terms of K unknowns, namely the sub-streams $S_k$:

$$\begin{aligned} r_1 &= h_{11}s_1 + h_{12}s_2 + \ldots + h_{1k}s_k + \ldots + h_{1K}s_K + n_1 \\ &\vdots \\ r_j &= h_{j1}s_1 + h_{j2}s_2 + \ldots + h_{jk}s_k + \ldots + h_{jK}s_K + n_j \\ &\vdots \\ r_J &= h_{J1}s_1 + h_{J2}s_2 + \ldots + h_{Jk}s_k + \ldots + h_{JK}s_K + n_J \end{aligned} \tag{8}$$

The coefficients $h_{jk}$ that multiply the K sub-streams in each of the J signals (or equations) are the elements of the transfer matrix H, which represent the complex transfer coefficients between the K transmit directions and J receive directions. (Alternatively, if the receiver 112 is receiving from a BLAST-type transmitter, then the coefficient $h_{jk}$ represents the coefficient between the $k^{th}$ transmitter antenna and the $j^{th}$ receive direction.) Hence, once the transfer matrix has been determined, by a channel characterising block 608, via some training scheme, the problem is essentially that of solving the set of simultaneous equations presented in equation 8 (assuming $J \geqq K$). The terms $n^j$ represent the additive white Gaussian noise due to thermal noise in the environment and transceivers and are identically distributed, but independent.

There are again a variety of ways the sub-streams can be extracted using established techniques. These techniques are generally based on multi-user detection systems used in CDMA, where the aim is to identify different users. Here instead the aim is to identify different sub-streams carrying different signals. In the BLAST system, when an attempt is being made to decode a single sub-stream, $r_k$, all other contributions from interfering sub-streams are 'nulled' and any sub-streams already detected are subtracted from the received vector of signals $\hat{r}$. The process of nulling the interfering sub-streams is very similar to that described above for beamforming of the sub-streams by the transmitter 106, and is also detailed in the paper on BLAST cited above.

In essence these techniques are equivalent to conventional methods of solving linear simultaneous equations, with the difference that in the present case the equations involve quantities that are not perfectly known because of the presence of noise in the system. It is for this reason that $\hat{r}_k$ is a decision statistic for the $k^{th}$ sub-stream, as in conventional communication systems, rather than the sub-stream itself. Hence, each sub-stream $\hat{r}_k$ is subjected to a conventional bit-decision demodulation process, i.e. is it a one or a zero? Thus, using these techniques the K sub-streams are recovered and multiplexed back by a multiplexing block 610 to regenerate the original high data rate bitstream R(t).

The present invention can in principle be applied to any wireless communication scenario to give data rates with high spectral efficiency (i.e. high data rates in a relatively small bandwidth). The main requirement for the invention to work effectively is enough independent multipath signals separated with angle. As long as the number of independent multipath components J is greater than or equal to the number of antennas M in the transmitter array, the 'Shannon' capacity of the present transceiver architecture used in a MIMO system will increase linearly with M. Most of the analysis above assumes that the transmitter 106 and receiver 112 are quasi-static, i.e. transmitter and receiver stationary with moving users or objects causing very slow changes in the channel (i.e. the elements of the transfer matrix H). However, the system can cope with a moving transmitter and receiver, as long as the frame duration is significantly less than the average period over which changes in the transfer matrix occur, making the system suitable for mobile cellular communications, as well as fixed point to point indoor wireless links.

As well as its use as a transceiver, the present invention is suitable for use as a transmitter only and as a receiver only combined with some other receiver or transmitter architecture respectively, for example BLAST, given the proper modifications discussed above. In particular, if a terminal only used the techniques of the present invention as a transmitter, it would still require a receiver capable of determining a variation in received signal characteristics with direction, to enable the transmit directions to be determined.

The embodiments described above above used the angular power spectrum A(Ω) of received signals to determine the directions from which the strongest signals were received and hence the optimum transmit and receive directions. However, other signal characterisations, for example SNR, could be used instead as long as they provided a suitable basis for selecting preferred directions. Whatever the signal characterisation employed, it will not always be necessary or desirable to characterise signals arriving from a full range of directions. For example, a land-based terminal may choose to ignore signals arriving from a near-vertical direction.

A range of modifications to the present invention is possible. The beamforming can be adaptive, so that the number of sub-streams J and their directions $\Omega_j$ vary, or fixed, the latter involving less complexity. In a relatively simple system the power and bit rate of all sub-streams are the same, while in a more complex system the power and/or bit rate of each sub-stream could be varied depending on its received SNR. The geometry of the array of antennas 108 can span one, two or three dimensions to give a corresponding increase in the number of dimensions from which multipath signals can unambiguously be observed.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the specification and claims the word "a" or "an" preceding an element does not exclude the presence of a plurality of such elements. Further, the word "comprising" does not exclude the presence of other elements or steps than those listed.

The invention claimed is:

1. A radio communication system having a communication channel comprising a plurality of paths between first and second terminals each having a plurality of antennas, wherein the first terminal comprises a receiver configured to determine a plurality of directions from which signals arrive from the second terminal, and a transmitter configured to separate a signal for transmission into a plurality of sub-streams for transmitting each sub-stream into a respective one of the plurality of directions determined by the receiver, wherein the transmitter includes a controller configured to independently adjust the power and/or bitrate of each sub-stream depending on a signal quality parameter of the sub-stream.

2. A system as claimed in claim 1, wherein the receiver further comprises means for determining an angular power distribution of incoming signals.

3. A system as claimed in claim 2, wherein the receiver further comprises means for selecting from the plurality of directions those directions from which the strongest signals arrive from the second terminal.

4. A terminal for use in a radio communication system having a communication channel comprising a plurality of paths between the terminal and another terminal, wherein transmitting means are provided having means for separating a signal for transmission into a plurality of sub-streams, the transmitting means being configured for transmitting each sub-stream into a respective one of the plurality of directions, wherein the transmitting means includes control means for independently adjusting the power and/or bitrate of each sub-stream depending on a signal quality parameter of the sub-stream.

5. A terminal as claimed in claim 4, further comprising means for receiving a plurality of respective signals from some or all of the plurality of directions, means for extracting a plurality of sub-streams from the received signals, and means for combining the plurality of sub-streams to provide an output data stream.

6. A terminal as claimed in claim 5, wherein the numbers of transmitted and received sub-streams are not equal.

7. A terminal as claimed in claim 4, further comprising means for determining an angular power distribution of incoming signals.

8. A terminal as claimed in claim 7, further comprising means for selecting from the plurality of directions those directions from which the strongest signals arrive from the second terminal.

9. A terminal as claimed in claim 4, wherein the control means are configured for operating the plurality of antennas as an array and for adapting the antenna pattern for each sub-stream such that a peak in the antenna pattern corresponds to the respective direction and nulls in the antenna pattern correspond to the directions in which other sub-streams are transmitted.

10. A terminal for use in a radio communication system having a communication channel comprising a plurality of paths between the terminal and another terminal, wherein receiving means are provided having direction determining means for determining a plurality of directions from which signals arrive from the other terminal, and transmitting means are provided having means for separating a signal for transmission into a plurality of sub-streams, the transmitting means being configured for transmitting each sub-stream into a respective one of the plurality of directions determined by the receiving means, wherein the transmitting means includes control means for independently adjusting the power and/or bitrate of each sub-stream depending on a signal quality parameter of the sub-stream.

11. A terminal for use in a radio communication system having a communication channel comprising a plurality of paths between the terminal and another terminal, the terminal comprising a controller configured for determining a plurality of directions from which received signals arrive from the other terminal, extracting a plurality of sub-streams from the received signals, and combining the plurality of sub-streams to provide an output data stream, the controller configured being further configured for operating a plurality of antennas as an array, adapting the antenna pattern for each sub-stream such that a peak in the antenna pattern corresponds to the respective direction, and independently adjusting the power and/or bitrate of each sub-stream depending on a signal quality parameter of the sub-stream.

12. A method of operating a radio communication system having a communication channel comprising a plurality of paths between first and second terminals each having a plurality of antennas, the method comprising the first terminal:

separating a signal for transmission into a plurality of sub-streams, transmitting each sub-stream into a respective one of the plurality of determined directions, and independently adjusting the power and/or bitrate of each transmitted sub-stream depending on a signal quality parameter of the sub-stream.

13. A method of operating a radio communication system having a communication channel comprising a plurality of paths between first and second terminals each having a plurality of antennas, the method comprising the first terminal:

determining a plurality of directions from which signals arrive from the second terminal, receiving signals from some or all of the plurality of directions, extracting a plurality of sub-streams from the received signals, combining the plurality of sub-streams to provide an output data stream, separating a signal for transmission into a plurality of sub-streams, transmitting each sub-stream into a respective one of the plurality of determined directions, and independently adjusting the power and/or bitrate of each transmitted sub-stream depending on a signal quality parameter of the sub-stream.

14. A radio communication system having a communication channel comprising a plurality of paths between first and second terminals each having a plurality of antennas, wherein the first terminal comprises receiving means having direction determining means for determining a plurality of directions from which signals arrive from the second terminal, means for receiving a plurality of respective signals from some or all of the plurality of directions, means for extracting a plurality of sub-streams from the received signals and means for combining the plurality of sub-streams to provide an output data stream, and the first terminal further comprises transmitting means having means for separating a signal for transmission into a plurality of sub-streams, the transmitting means being configured for transmitting each sub-stream into a respective one of the plurality of directions determined by the receiving means, wherein the transmitting means includes control means for independently adjusting the power and/or bitrate of each sub-stream depending on a signal quality parameter of the sub-stream.

15. A terminal for use in a radio communication system having a communication channel comprising a plurality of paths between the terminal and another terminal, wherein receiving means are provided having direction determining means for determining a plurality of directions from which signals arrive from the other terminal, means for receiving a plurality of respective signals from some or all of the plurality of directions, means for extracting a plurality of sub-streams from the received signals and means for combining the plurality of sub-streams to provide an output data stream, and transmitting means which includes control means for independently adjusting the power and/or bitrate of each sub-stream depending on a signal quality parameter of the sub-stream.

* * * * *